US012670403B2

(12) United States Patent (10) Patent No.: US 12,670,403 B2
Ramesh et al. (45) Date of Patent: Jun. 30, 2026

(54) CLASSIFIER WITH OUTLIER DETECTION ALGORITHM

(71) Applicant: The Boeing Company, Chicago, IL (US)

(72) Inventors: Anapathur Viswanathan Ramesh, Bothell, WA (US); Michael Thomas Swayne, Redmond, WA (US); Huafeng Yu, Madison, AL (US)

(73) Assignee: The Boeing Company, Arlington, VA (US)

( * ) Notice: Subject to any disclaimer, the term of this patent is extended or adjusted under 35 U.S.C. 154(b) by 1273 days.

(21) Appl. No.: 17/453,818

(22) Filed: Nov. 5, 2021

(65) Prior Publication Data

US 2022/0188646 A1 Jun. 16, 2022

Related U.S. Application Data

(60) Provisional application No. 63/123,943, filed on Dec. 10, 2020.

(51) Int. Cl.
G06N 3/088 (2023.01)
G06F 18/24 (2023.01)
(Continued)

(52) U.S. Cl.
CPC ............. G06N 3/088 (2013.01); G06F 18/24 (2023.01); G06N 3/045 (2023.01); G06V 30/248 (2022.01); G06V 30/2528 (2022.01)

(58) Field of Classification Search
CPC .. G06V 30/248; G06V 30/2528; G06N 3/045; G06N 3/088; G06F 18/24
See application file for complete search history.

(56) References Cited

U.S. PATENT DOCUMENTS 10,964,130 B1* 3/2021 Dixit ................... G05B 23/0283
2017/0331844 A1* 11/2017 Harrigan ................ G06N 20/00
(Continued)

OTHER PUBLICATIONS

Anonymous, "Machine Learning Algorithms for Smart Meter Diagnostics," IP.com Prior Art Technical Disclosure, May 26, 2015, 53 pgs. (Year: 2015).*

(Continued)

*Primary Examiner* — Eric J. Bycer
(74) *Attorney, Agent, or Firm* — Alleman Hall LLP

(57) ABSTRACT

A classifier is executed including an unsupervised artificial intelligence model and a supervised artificial intelligence model. The classifier is configured to receive run-time input data, and process the run-time input data using the unsupervised artificial intelligence model and an outlier detection algorithm to determine whether the run-time input data is an outlier as compared to training input data. Responsive to determining that the run-time input data is not an outlier, the classifier determines a predicted response label for the run-time input based on the run-time input data processed using the supervised artificial intelligence model. Responsive to determining that the run-time input data is an outlier, the classifier refrains from determining the predicted response label for the run-time input based on the run-time input data processed using the supervised artificial intelligence model, and instead outputs a prompt for user input of a user-curated response label for the run-time input.

20 Claims, 11 Drawing Sheets

(51) Int. Cl.
  G06N 3/045 (2023.01)
  G06V 30/24 (2022.01)

(56) References Cited

U.S. PATENT DOCUMENTS

| | | | | |
|---|---|---|---|---|
| 2018/0300371 A1* | 10/2018 | Aggarwal | ............. | G06F 16/252 |
| 2019/0050368 A1* | 2/2019 | Chen | ..................... | G06N 20/10 |
| 2019/0147670 A1* | 5/2019 | Chopra | ................ | G07C 5/0808 |
| | | | | 701/29.1 |
| 2019/0389565 A1* | 12/2019 | Lissajoux | ................ | G08G 5/21 |
| 2020/0050191 A1* | 2/2020 | Kwon | .................. | G05D 1/0246 |
| 2020/0162489 A1* | 5/2020 | Bar-Nahum | ............. | G08G 5/55 |
| 2020/0285997 A1* | 9/2020 | Bhattacharyya | ......... | G06N 7/01 |
| 2020/0379454 A1* | 12/2020 | Trinh | ................... | G05B 23/024 |
| 2021/0056412 A1* | 2/2021 | Jung | ...................... | G06N 3/045 |
| 2021/0097058 A1* | 4/2021 | Skiles | ...................... | B64F 5/40 |
| 2021/0174196 A1* | 6/2021 | Desmond | ............ | G06F 18/2321 |
| 2021/0295213 A1* | 9/2021 | Raveh | ................ | G06V 10/764 |
| 2021/0334656 A1* | 10/2021 | Sjögren | ................... | G06N 3/08 |
| 2022/0138509 A1* | 5/2022 | Crosby | ................ | G06F 18/241 |
| | | | | 706/12 |

OTHER PUBLICATIONS

Usama et al., "Unsupervised Machine Learning for Networking: Techniques, Applications and Research Challenges," IEEE Access, vol. 7, 2019, pgs. 65579-65615. (Year: 2019).*
US Patent and Trademark Office "Jul. 2024 Subject Matter Eligibility Examples," 35 pgs. (Year: 2024).*

* cited by examiner

TRAINING PHASE
INITIAL TRAINING PHASE: ⟶
FEEDBACK TRAINING PHASE: - - ➤

RUN-TIME PHASE

CLASSIFIER WITH OUTLIER DETECTION ALGORITHM

CROSS REFERENCE TO RELATED APPLICATIONS

This application claims priority to U.S. Provisional Patent Application Ser. No. 63/123,943, filed Dec. 10, 2020, the entirety of which is hereby incorporated herein by reference for all purposes.

FIELD

The subject disclosure relates generally to machine learning and artificial intelligence processes and systems, and in particular to such systems that are configured to determine outliers in input data to appropriately make predictions based on the input data. The techniques described herein can be applied to artificial intelligence systems that process data related to vehicles such as aircraft, for example.

BACKGROUND

While machine learning and artificial intelligence systems show great promise in predictively classifying data in a wide variety of industrial applications, including data related to vehicles such as aircraft, the possibility exists that such systems can make predictions that are not accurate. One approach to evaluating the accuracy of a machine learning algorithm is to create a confusion matrix, which statistically summarizes the false positives, true positives, false negatives, and true negatives predicted by the system based on test data. However, in applications with a low tolerance for prediction errors, the analysis provided by confusion matrices can fall short of enabling the system to meet the need for reliable predictions. Thus, a challenge exists to further increase the reliability of machine learning predictions.

SUMMARY

This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented in this disclosure.

A computing system is disclosed that comprises a processor and a non-volatile memory storing executable instructions that, in response to execution by the processor, cause the processor to execute a classifier including an unsupervised artificial intelligence model and a supervised artificial intelligence model. The classifier is configured to receive run-time input data, and process the run-time input data using the unsupervised artificial intelligence model and an outlier detection algorithm to determine whether the run-time input data is an outlier as compared to training input data. The classifier, responsive to determining that the run-time input data is not an outlier, is configured to determine a predicted response label for the run-time input based on the run-time input data processed using the supervised artificial intelligence model. The classifier, responsive to determining that the run-time input data is an outlier, is configured to refrain from determining the predicted response label for the run-time input based on the run-time input data processed using the supervised artificial intelligence model, and instead output a prompt for user input of a user-curated response label for the run-time input.

The features, functions, and advantages that have been discussed can be achieved independently in various embodiments or can be combined in yet other embodiments further details of which can be seen with reference to the following description and drawings.

DETAILED DESCRIPTION

In view of the above issues, a computing system is provided that can reliably make predictions using a classifier trained using machine learning techniques. The reliability of the predictions of the classifier is achieved by refraining from adopting predictions for run-time inputs that are sufficiently different from the training data set on which the classifier has been trained. The architecture of the computing system, manner of training the classifier, and manner of determining the similarity of the run-time inputs and the training data set will now be described.

Figure 1:
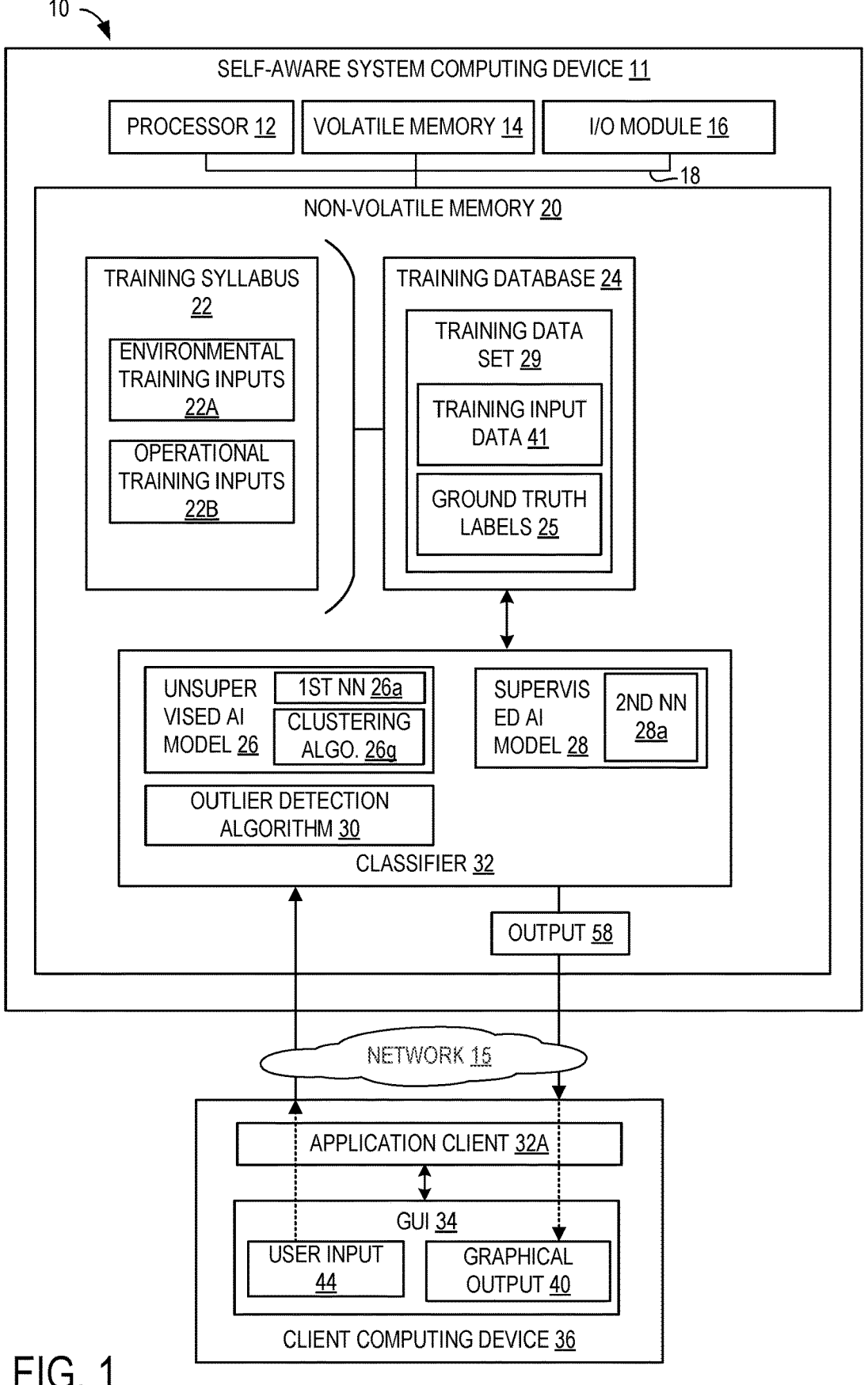
FIG. 1 shows an illustration depicting a computing system according to an example embodiment of the subject disclosure.

Referring to FIG. 1, a computing system 10 is provided for use in achieving reliable machine learning predictions. The computing system 10 comprises a computing device 11 comprising a processor 12, an input/output module 16, volatile memory 14, and non-volatile memory 20 storing a classifier 32 including an outlier detection algorithm 30 and two artificial intelligence models: an unsupervised artificial intelligence model 26 including a first neural network 26a and/or clustering algorithm that has been trained on training input data 41, and a supervised artificial intelligence model 28 including a second neural network 28a that has been trained on training input data 41 and ground truth labels 25 that are associated with the training input data 41.

A training data set 29 including the training input data 41 and ground truth labels 25 can be stored in a training database 24 on the non-volatile memory 20. The training database 24 can include a training syllabus 22 with environmental training inputs 22A and operational training inputs 22B.

A bus 18 can operatively couple the processor 12, the input/output module 16, and the volatile memory 14 to the non-volatile memory 20. Although the classifier 32, the outlier detection algorithm 30, the supervised artificial intelligence model 28, and the unsupervised artificial intelligence model 26 are depicted as hosted (i.e., executed) at one computing device 11, it will be appreciated that the classifier 32, the outlier detection algorithm 30, the supervised artificial intelligence model 28, and the unsupervised artificial intelligence model 26 can alternatively be hosted across a plurality of computing devices to which the computing device 11 is communicatively coupled via a network 15. As one example of one such other computing device, a client computing device 36 may be provided, which is operatively coupled to the computing device 11. In some examples, the network 15 can take the form of a local area network (LAN), wide area network (WAN), wired network, wireless network, personal area network, or a combination thereof, and can include the Internet.

The computing system 10 comprises a processor 12 and a non-volatile memory 20 configured to store the classifier 32 including the outlier detection algorithm 30, the supervised artificial intelligence model 28, and the unsupervised artificial intelligence model 26 in non-volatile memory 14. Non-volatile memory 14 is memory that retains instructions stored data even in the absence of externally applied power, such as FLASH memory, a hard disk, read only memory (ROM), electrically erasable programmable memory (EE-PROM), etc. The instructions include one or more programs, including the classifier 32, and data used by such programs sufficient to perform the operations described herein. In response to execution by the processor 12, the instructions cause the processor 12 to execute the classifier 32 including the supervised artificial intelligence model 28, the unsupervised artificial intelligence model 26, and the outlier detection algorithm 30.

The processor 12 is a microprocessor that includes one or more of a central processing unit (CPU), a graphical processing unit (GPU), an application specific integrated circuit (ASIC), a system on chip (SOC), a field-programmable gate array (FPGA), a logic circuit, or other suitable type of microprocessor configured to perform the functions recited herein. The system 10 further includes volatile memory 14 such as random access memory (RAM), static random access memory (SRAM), dynamic random access memory (DRAM), etc., which temporarily stores data only for so long as power is applied during execution of programs.

In one example, the client computing device 36 can execute an application client 32A to send a user input 44 to the computing device 11, and subsequently receive output 58 including a predicted response label from the computing device 11. The application client 32A can be coupled to a graphical user interface 34 of the client computing device 36 to display graphical output 40 based on the output 58 from the classifier 32.

Figure 2:
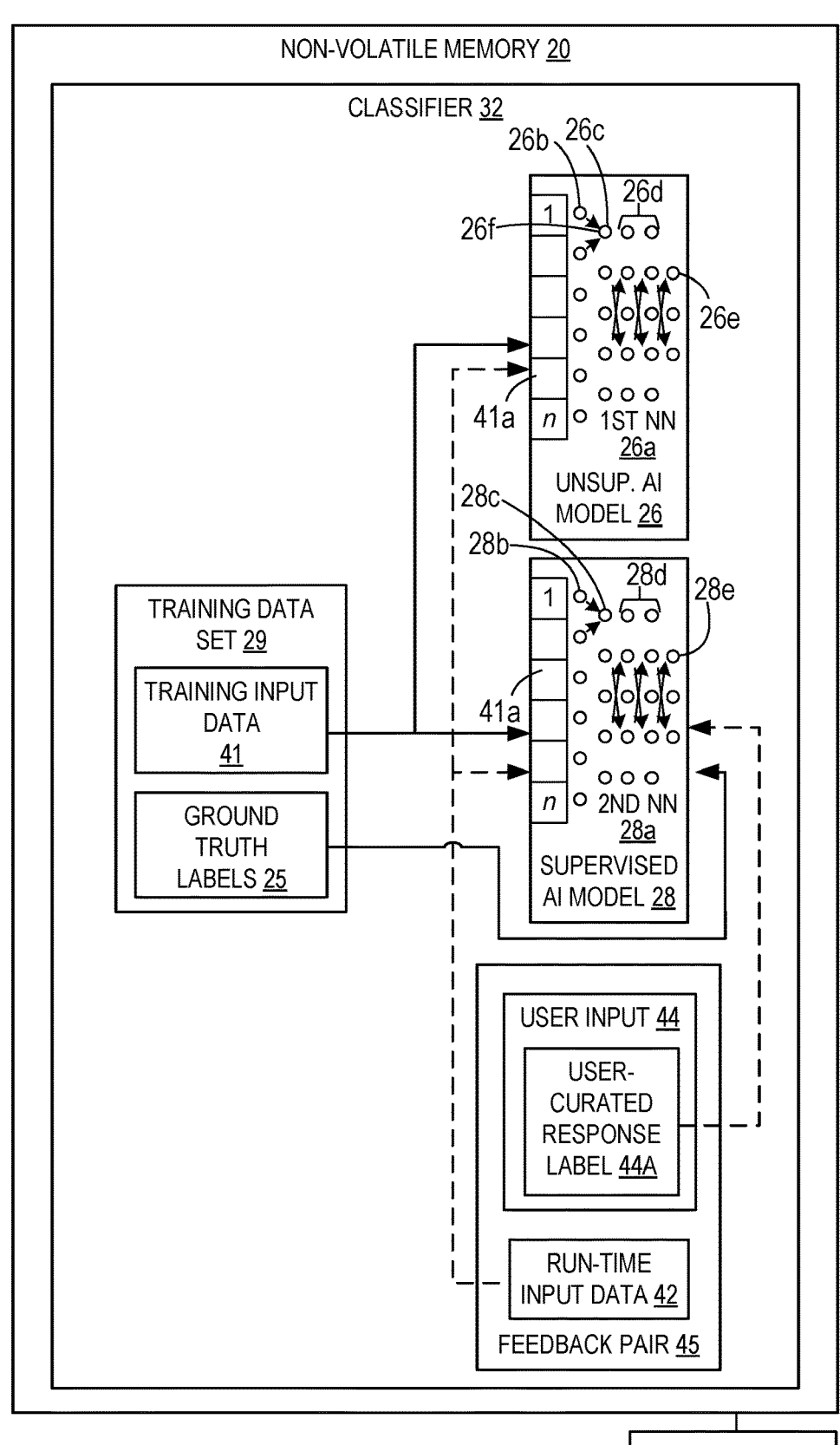
FIG. 2 shows an illustration depicting a training phase of a classifier of the computing system of FIG. 1.

Referring to FIG. 2, a training phase of the classifier 32 is illustrated, which includes an initial training phase (shown as solid arrows) and a feedback training phase (shown as dashed arrows). During the initial training phase, prior to run-time, the processor 12 is configured to pair the ground truth labels 25 with the training input data 41 in the training data set 29, and perform training of the supervised artificial intelligence model 28 using pairs of ground truth labels 25 and training input data 41 in the training data set 29. In one example, the supervised artificial intelligence model 28 includes the second neural network 28a, and the training takes place using backpropagation with gradient descent. The second neural network 28a has an input layer 28b connected to one or more convolutional layers 28c. The one or more convolutional layers are configured to extract features and reduce dimensionality of the input vector 41a. The one or more convolutional layers 28c are connected on a downstream side to one or more fully connected deep learning layers, which in turn are connected to an output layer 28e. When configured as a classification network, each of the nodes in the output layer 28e corresponds to a respective predicted response label 46 for the run-time input. Alternatively, the output layer 28e can be configured with a single output node that uses neural network regression to sums inputs from prior layers to output a single scalar value. As the second neural network 28a is trained, an input vector 41a and matched ground truth labels, which can be classifications or scalar values, are applied to the input layer 28b and output layer 28e respectively, and the weights in the network are computed through gradient descent and the backpropagation algorithm, for example, such that the trained neural network will properly classify (or properly value) the input vector to the matched ground truth classification or scalar value in the output layer 28e.

Figure 3:
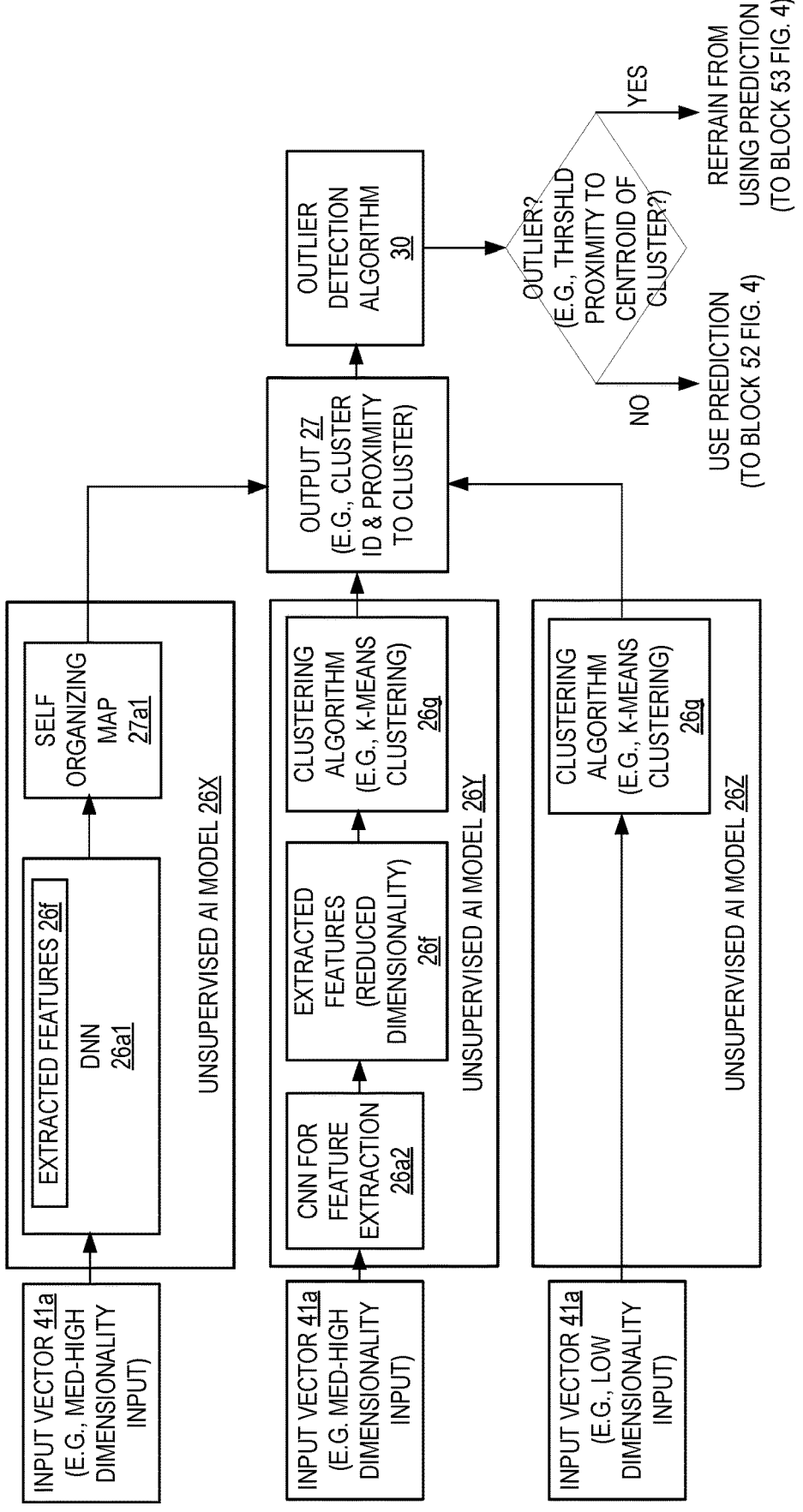
FIG. 3 shows an illustration depicting three configurations of an unsupervised artificial intelligence model of the classifier of FIG. 2.

Continuing with FIG. 2, the processor 12 also uses the training input data 41 to train the unsupervised artificial intelligence model 26 without pairing the training input data 41 with ground truth labels 25 or user-curated response labels 44A, such that the unsupervised artificial intelligence model 26 does not receive input of ground truth labels 25 or user-curated response labels 44A for training. The unsupervised artificial intelligence model 26 is trained to classify the training input data as belonging to one or more clusters. For each input vector 41a from training input data 41, the unsupervised artificial intelligence model 26 is configured to output a cluster classification and a proximity to the cluster center, such as a data distance to the cluster center or a percentage distance to the cluster center. To achieve this functionality, the unsupervised artificial intelligence model 26 can take one of several specific forms, as shown in FIG. 3, discussed below. In the example form shown in FIG. 2, the unsupervised artificial intelligence model 26 includes the first neural network 26a, which includes an input layer 26b connected to one or more convolutional layers 26c, which in turn are connected to one or more fully connected hidden layers 26d of fully connected nodes, which in turn are connected to an output layer 26e. The input layer receives the parameters in the input vector 41a from the training put data 41. The convolutional layers 26c extract features from the input layer, and can pass those features along to the fully connected layers 26d, possibly through one or more pooling layers. The output layer 26e can include a plurality of output nodes, each of which represents a respective classification label that the first neural network 26a is trained to apply, such as a cluster identification. In one example discussed below, the first neural network 26a is trained through a competitive learning algorithm rather than backpropagation and gradient descent to both reduce the dimensionality of the input vectors and maximize the distance between the output cluster classifications. The result is output as a self-organizing feature map 27a1 (see FIG. 3). Other example configurations of the unsupervised artificial intelligence model 28 are discussed below.

Following initial training, the trained classifier can be deployed at run-time and can undergo feedback training during a subsequent feedback training phase, based upon data received during the run-time phase, as shown in dashed arrows. Thus, the processor 12 is configured to receive user input 44 including the user-curated response label 44A for the run-time input data 42, pair the user-curated response label 44A with run-time input data 42 to create a feedback training data pair 45, and perform feedback training of the supervised artificial intelligence model 28 using the feedback training data pair 45. The unsupervised artificial intelligence model 26 can also be fed the run-time input data 42 during the feedback training, which has the effect of causing unsupervised artificial intelligence model 26 to cluster the data along with the prior training input data 41 encountered during the initial training phase. In this way, subsequent input data that is similar to the run-time input data 42 encountered during feedback training by the classifier 32, will be recognized by the unsupervised artificial intelligence model 26 as similar to data on which the supervised artificial intelligence model 28 has been trained.

Turning now to FIG. 3, three example configurations of the unsupervised artificial intelligence model 26 are illustrated at 26X, 26Y, and 26Z, each of which can be used independently or in combination with one another. Unsupervised artificial intelligence model 26X includes a first neural network 26a1, which is a deep neural network DNN that includes one or more fully connected layers 26d, and an output layer 26e configured as a self-organizing feature map 27a1. The nodes of the output layer 26e are organized in a 2D or 3D grid typically, and weights to each node from input side layers are adjusted to reflect a mapping of the features extracted from the input vector to the output nodes. As discussed above, the self-organizing map of the first neural network 26a1 extracts features from the input data and applies a competitive learning algorithm, as opposed to backpropagation with gradient descent, to reduce the dimensionality of the input vector to a low dimensionality (e.g., 2 or 3 dimensions in some examples) map on which the input data is clustered. The self-organizing feature map 27a1 includes clusters of the training input data 41. The first neural network 26a1 creates a feature map containing clusters of the training input data, with each cluster having a center (i.e., centroid) and a cluster identifier. After training, when run-time input is passed through the trained unsupervised artificial intelligence model 26X, it produces output 27 containing the cluster ID and proximity of the run-time input to the cluster centroid, to the outlier detection algorithm.

As another example, the unsupervised artificial intelligence model 26Y can include a convolutional neural network 26a2 that has been trained to extract features 26f from the input vector 41a. The extracted features 26f have reduced dimensionality as compared to the input vector 41a. Unsupervised artificial intelligence model 26Y further includes a clustering analysis algorithm 26g that clusters the extracted features 26f, by a clustering technique, such as k-means clustering. In addition to k-means clustering, the cluster analysis algorithm 26g of the unsupervised artificial intelligence model 26 can implement one or more of hierarchical clustering, mixture modeling, a DBSCAN (Density-Based Spatial Clustering of Applications with Noise) algorithm, and an OPTICS (Ordering Points To Identify the Clustering Structure) algorithm. The output 27 of the clustering algorithm is a cluster identifier and a metric indicating the proximity to a center of the cluster, for each input vector 41a.

As yet another example, particularly applicable to input vectors 41a having a lower dimensionality, unsupervised artificial intelligence model 26Z does not include a neural network, but rather is configured to pass the input vectors 41a from the training input data 41 or run-time input directly to the clustering analysis algorithm 26g, which is configured to perform clustering such as k-means clustering or other type of clustering. The output 27 of the clustering analysis algorithm 26g for the unsupervised artificial intelligence model 26Z, similar to that discussed above, is a cluster identifier and a metric indicating the proximity to a center of the cluster, for each input vector 41a.

Figure 4:
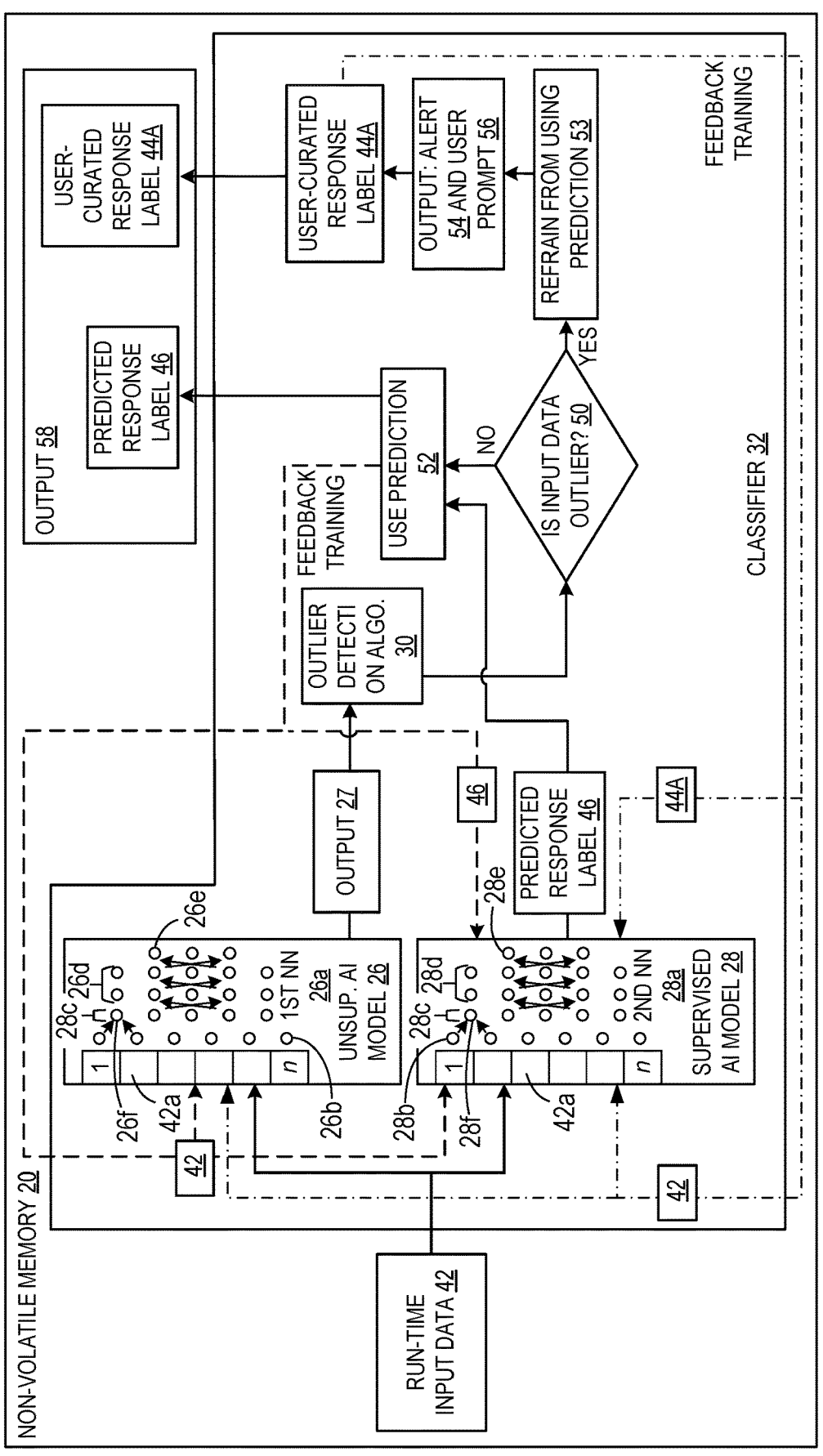
FIG. 4 shows an illustration depicting a run-time phase of the classifier of the computing system of FIG. 1.

Referring to FIG. 4, a run-time phase of the classifier 32 is illustrated. The classifier 32 is configured to receive run-time input data 42 in the form of a run-time input vector 42a, which is processed using the unsupervised artificial intelligence model 26. The unsupervised artificial intelligence model 26 extracts and/or clusters a first set of features 26f using convolutional layers 26c, and generates an output 27 based on the run-time input data 42. Typically the output 27 includes a cluster identification and a cluster proximity for the run-time input vector 42a. The supervised artificial intelligence model 28 extracts a second set of features 28f using its convolutional layers 28c, processes the extracted features 28f using its fully connected layers 28d, and generates a predicted response label 46 based on the run-time input data 42. In some embodiments, the predicted response label can be generated only responsive to a determination by the outlier detection algorithm 30 that the run-time input is not an outlier, to save compute time if the predicted response label will not be used, as discussed below. In other embodiments, the predicted response label 46 can be generated irrespective of the analysis by the outlier detection algorithm 30.

The output 27 of the unsupervised artificial intelligence model 26 is further processed using an outlier detection algorithm 30 conducting analysis on the output 27 to determine whether the run-time input data 42 is an outlier as compared to training input data 41. The analysis conducted by the outlier detection algorithm 30 can be a distribution analysis or a metrics-based analysis. The classifier 32 can perform the distribution analysis or the metrics-based analysis on the first set of extracted features 26f according to the distribution analysis or the metrics-based analysis in order to determine whether the first set of extracted features 26f of the run-time input data 42 is an outlier as compared to aggregate extracted features of the training input data 41. It will be appreciated that at least a part of the analysis conducted by the outlier detection algorithm 30 can also be performed by the unsupervised artificial intelligence model 26. As two specific examples, the outlier detection algorithm can include a predetermined threshold proximity, such as a threshold data distance (e.g., having a normalized data distance on a zero to one scale of 0.8 or higher) or a threshold distribution distance (e.g., in the 95th percentile or higher for data distance), away from the training data set 41. The outlier detection algorithm 30 can compare the cluster proximity in output 27 to the predetermined threshold to make the outlier determination.

At decision block 50 the flow branches depending on the result of the analysis by the outlier detection algorithm 30. If the determination by the outlier detection algorithm 30 is NO that the run-time input data is not an outlier, then the process flow proceeds to block 52, where a determination is made by the classifier 32 to use the predicted response label 46 for the run-time input data 42. In this manner, responsive to determining that the run-time input data 42 is not an outlier, a predicted response label 46 is determined for the run-time input based on the run-time input data 42 processed using the supervised artificial intelligence model 28. The predicted response label 46 is thus output as output 58.

Figure 6:
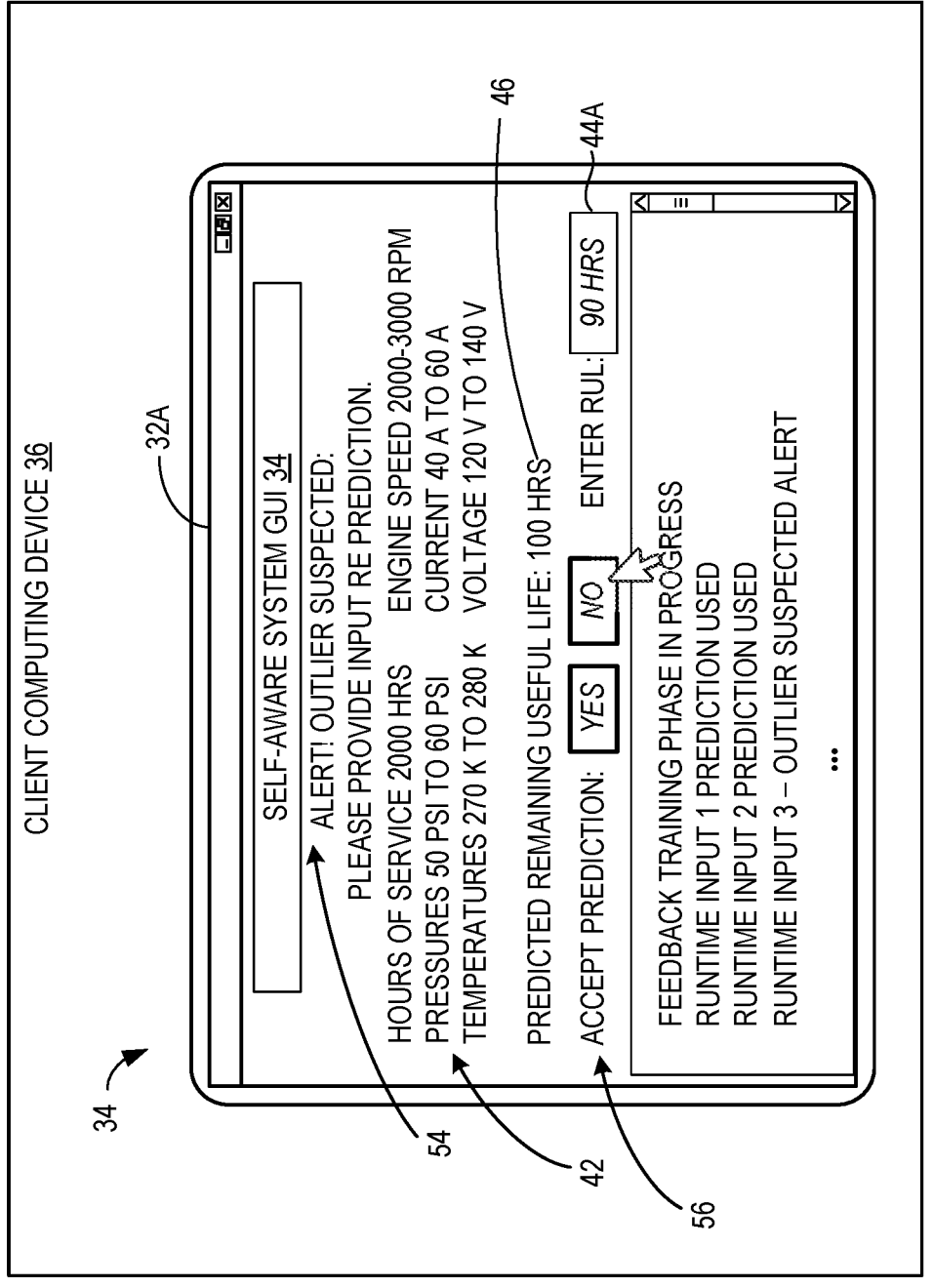
FIG. 6 shows an illustration of an exemplary graphical user interface of the computing system according to the example use case scenario illustrated in FIG. 5.
Figure 8:
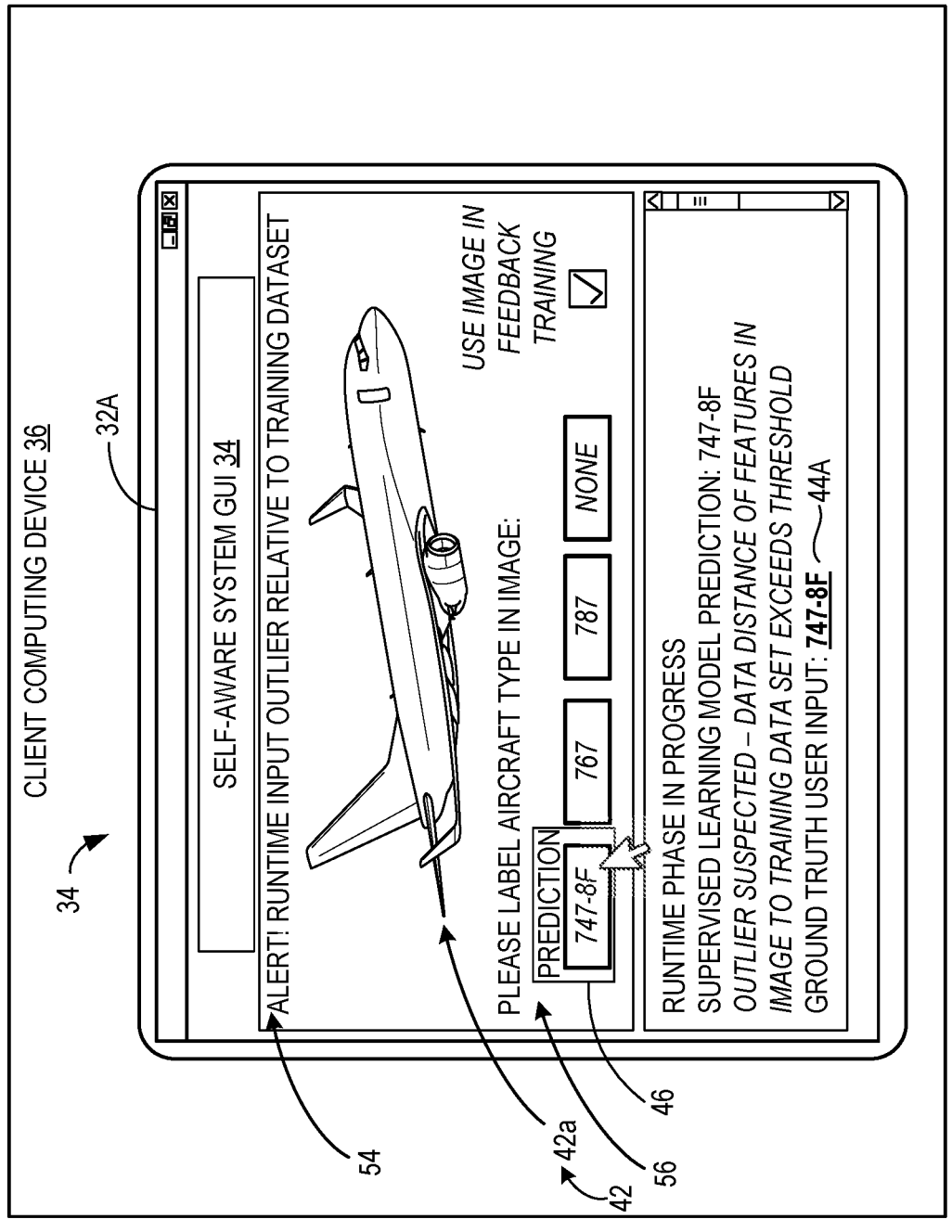
FIG. 8 shows an illustration of an exemplary graphical user interface of the computing system according to the example use case scenario of FIG. 7.
Figure 9:
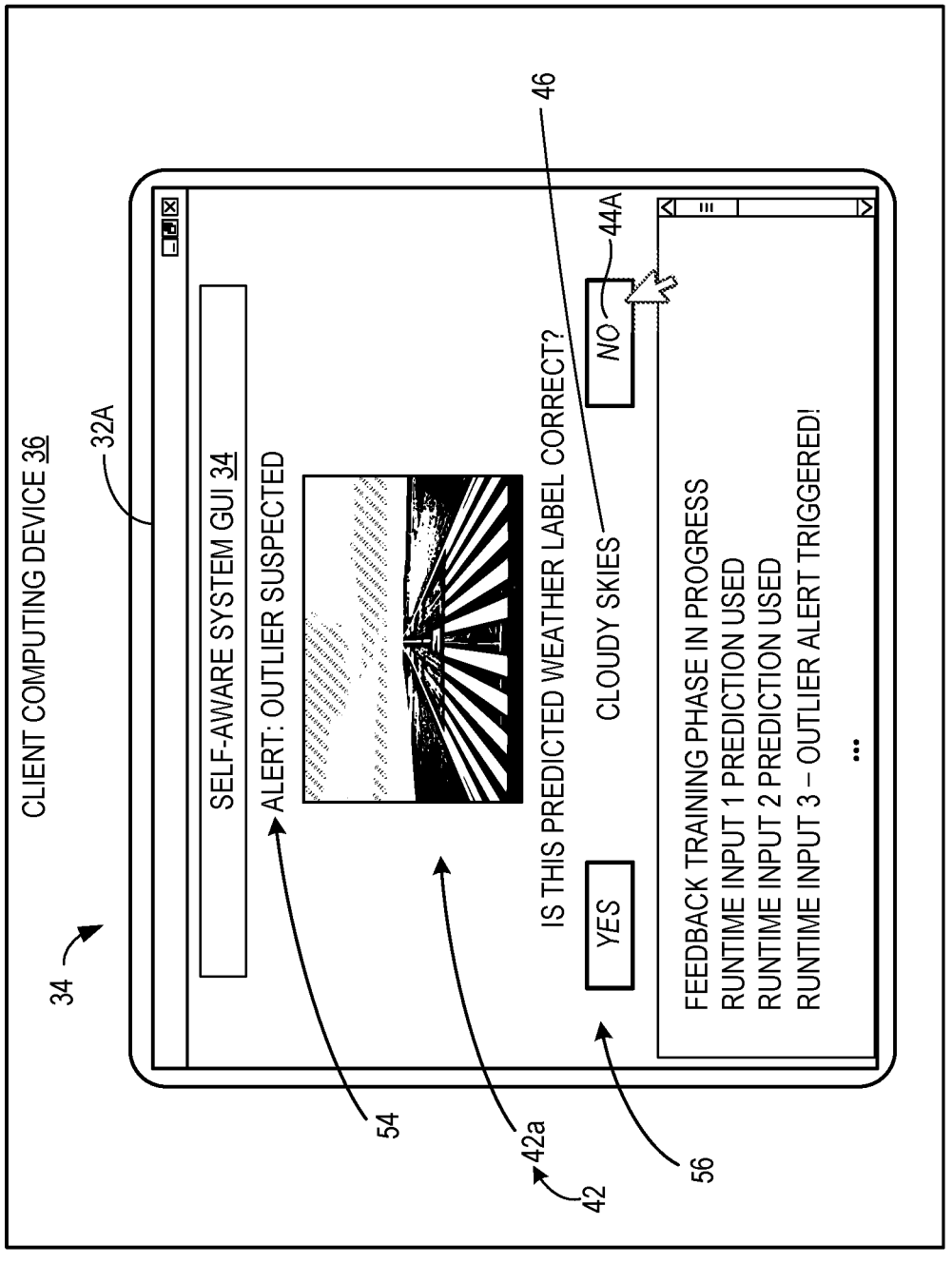
FIG. 9 shows an illustration of an exemplary graphical user interface of a classifier of the computing system of FIG. 1 in determining weather conditions according to another example use case scenario of the subject disclosure.

At decision block 50, if the determination by the outlier detection algorithm 30 is YES that the run-time input data is an outlier, then the process flow proceeds to block 53, where a determination is made by the classifier 32 to refrain from using the predicted response label 46 for the run-time input data 42. In this manner, responsive to determining that the run-time input data 42 is not an outlier, the classifier 32 refrains from determining the predicted response label 46 for the run-time input data 42 based on the run-time input data 42 processed using the supervised artificial intelligence model 28, and instead outputs an alert 54 and a user prompt 56. At the user prompt 56, the user can input the user-curated response label 44A for the run-time input, so that the user-curated response label 44A is used to train the unsupervised artificial intelligence model 26 and the supervised artificial intelligence model 28. The user-curated response label 44A and the predicted response label 46 are thus output as output 58. Example graphical user interfaces 34 illustrating the alert 54 and user prompts 56 are shown in FIGS. 6, 8 and 9.

In addition, the classifier 32 is configured to perform feedback training of the unsupervised artificial intelligence model 26 and the supervised artificial intelligence model 28, as discussed above in relation to FIG. 2. In FIG. 4, the feedback training is also illustrated in dashed lines. Two types of feedback training are illustrated: feedback training based on a user-curated response following an outlier determination (dot-dash lines), and feedback training when the run-time input is not an outlier and the predicted response label is used by the classifier 32 (dashed lines). Following the dot-dash lines, in the feedback training of the supervised artificial intelligence model 28 following an outlier determination at decision block 50, the run-time input data 42 and user-curated response label 44A are fed as a training feedback pair to the supervised artificial intelligence model 28, and backpropagation is applied to adjust the weights of the model. Further, the run-time input data 42 is fed to the unsupervised artificial intelligence model and cluster analysis is performed in the manner shown in FIG. 3. In this way, the trained supervised artificial intelligence model 28 is updated to recognize input similar to the run-time input and properly classify it with the user-curated response label 44A in the future, and the unsupervised artificial intelligence model is updated to recognize that the run-time input has been used to train the supervised artificial intelligence model.

Feedback training after a determination that the run—time input is not an outlier proceeds as follows. The supervised artificial intelligence model 28 is trained using a feedback training pair of the predicted response label 46 and the run-time input data 42. Further, the unsupervised artificial intelligence network is trained by feeding the run-time input data 42 thereto, such that it recognizes that the supervised artificial intelligence model has been trained on the run-time input data 42.

Figure 5:
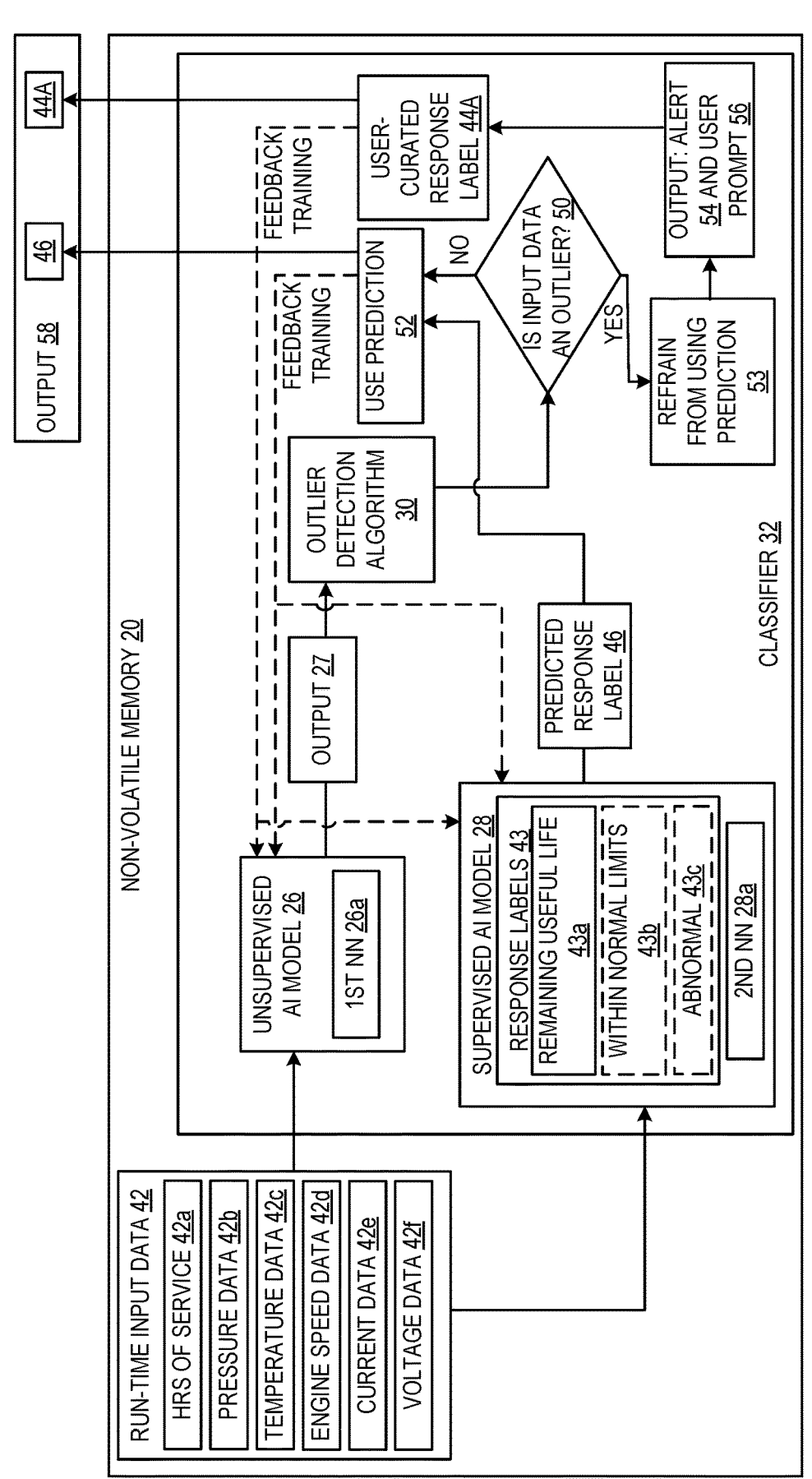
FIG. 5 shows an illustration depicting a practical application of the classifier of the computing system of FIG. 1, in determining remaining useful life according to an example use case scenario of the subject disclosure.

Referring to FIG. 5, an example of a classifier 32 is depicted in which the run-time input data 42 is sensor data, which, for example, can be sensor data collected from on-board sensors on a vehicle such as an aircraft. Alternatively, sensors external to the vehicle can provide some or all of sensor data 42. In this example, the classifier 32 is used to predict the remaining useful life 43a of a component of the vehicle, or determine an abnormality in the component based on a plurality of parameters from a plurality of sensors. The ground truth labels associated with the training input data used to train the supervised artificial intelligence model 28 include a remaining useful life parameter, or labels indicating whether the parameters are within normal operational limits. Since the example of FIG. 5 is substantially similar to the example of FIG. 4 with the exception of the run-time input data 42 and the response labels 43, the detailed description of the example of FIG. 5 is abbreviated here for the sake of brevity.

In this example, the run-time input data 42 includes hours of service 42a, pressure data 42b from a pressure sensor, temperature data 42c from a temperature sensor, engine speed data 42d from an engine speed sensor, electrical current data 42e from an electrical current sensor, and voltage data 42f from a voltage sensor as a time series. The run-time input data 42 can be processed by the artificial intelligence models 26, 28 as a multidimensional array or input image. The supervised artificial intelligence model 28 can be trained on training input data including a time series of input parameters including sensor data, and a ground truth output parameter that is an actual measurement of remaining useful life. The unsupervised artificial intelligence model 26 and the supervised artificial intelligence model 28 can include a first neural network 26a and a second neural network 28a, respectively, which are configured as LSTM (long short-term memory) recurrent neural networks.

The response labels 43 predicted by the supervised artificial intelligence model 28 include remaining useful life 43a, which is a time regression outputted as a scalar value. However the response labels 43 can also include "within normal limits" 43b and "abnormal" 43c, so that run-time input data 42 that is determined to be within normal operational limits is labeled with a predicted response label 46 of "within normal limits" 43b, while run-time input data 42 that is determined to be outside normal operational limits is labeled with a predicted response label 46 of "abnormal" 43c.

Referring to FIG. 6, an exemplary graphical user interface 34 is illustrated of the client computing device 36 executing the application client 32A according to the example of FIG. 5. The user prompt 56 for the user is shown on the graphical user interface 34 for the user to indicate whether or not to accept the run-time input data 42. In this example, the predicted response label 46 predicted by the supervised artificial intelligence model 28 is a remaining useful life of a component of 100 hours based on run-time input data of the component of 2000 hours of service, pressures from 50 to 60 psi, temperatures from 270K to 280K, engine speeds from 2000 rpm to 3000 rpm, current from 40 A to 60 A, and voltage from 120V to 140V. If the user decides to accept the run-time input data 42, and the correct remaining useful life is actually 90 hours, the user clicks the 'yes' button and inputs '90 hours' as the user-curated response label 44A which is used to train the unsupervised artificial intelligence model 26 and the supervised artificial intelligence model 28. In other embodiments, the user can simply select a user-curated response label from a multiple-choice selector of various label options. If the user decides to reject the run-time input data 42, the user clicks the 'no' button, and an alert can be outputted on the graphical user interface 34 accordingly.

Figure 7:
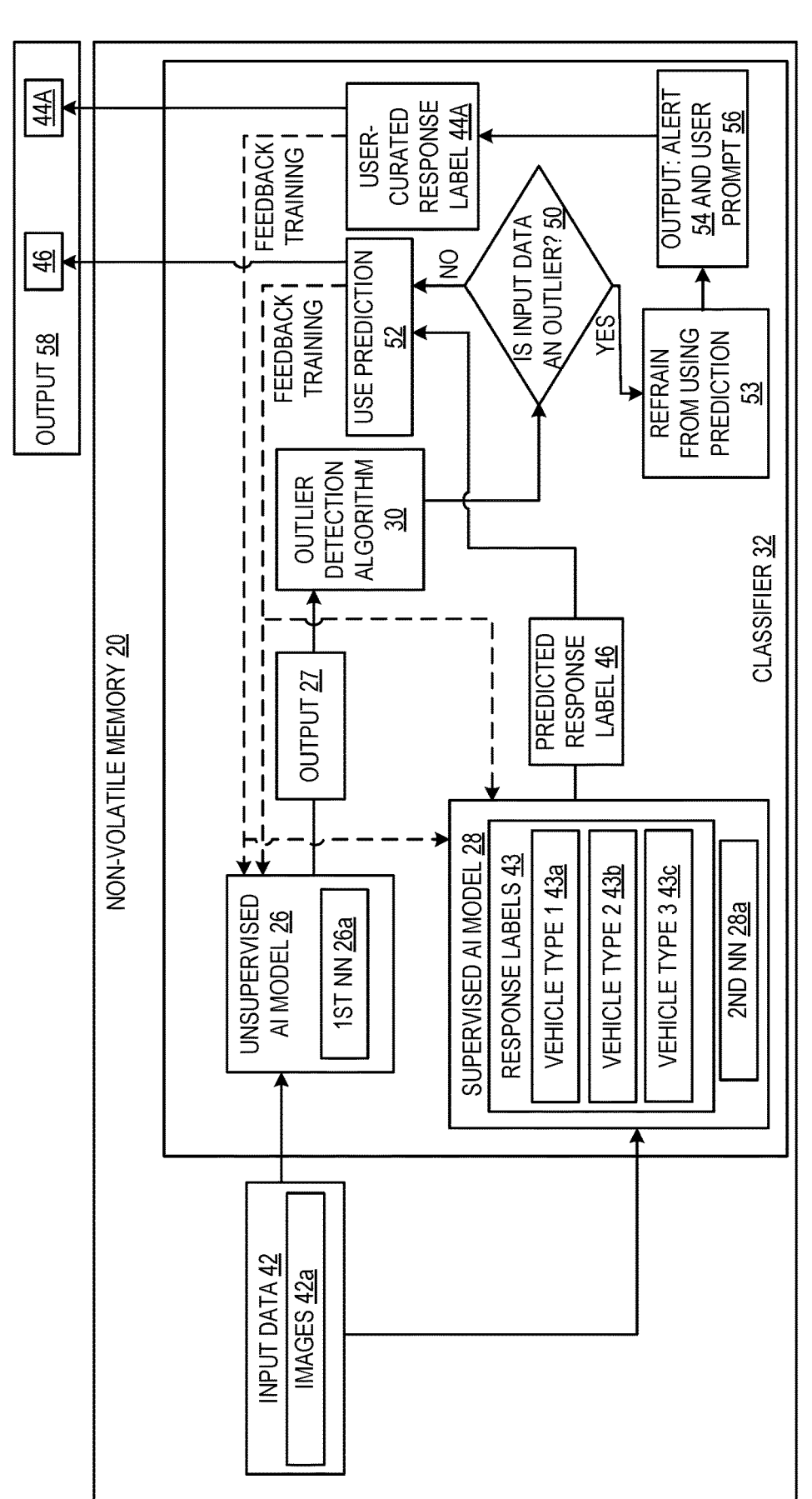
FIG. 7 shows an illustration depicting a practical application of the classifier of the computing system of FIG. 1, in determining vehicle type according to an example use case scenario of the subject disclosure.

Referring to FIG. 7, an example of a classifier 32 is depicted in which the run-time input data 42 includes a collection of images 42a from an on-board camera, the images capturing an external environment of a vehicle. The ground truth labels associated with the training input data used to train the supervised artificial intelligence model 28 include a vehicle type label for each of the images selected from a defined set of vehicle type labels. The predicted response label 46 is one of the vehicle type labels. The vehicle can be an aircraft, and the vehicle type labels can be aircraft type labels. Since the example of FIG. 7 is substantially similar to the example of FIG. 5 with the exception of the run-time input data 42 and the response labels 43, the detailed description of the example of FIG. 7 is abbreviated here for the sake of brevity.

The images 42a from the on-board camera can include images of runways, vehicles, airplanes, and people, for example. In this example, the response labels 43 predicted by the supervised artificial intelligence model 28 include a plurality of vehicle types including vehicle type 1 43a, vehicle type 2 43b, and vehicle type 3 43c. Accordingly, the supervised artificial intelligence model 28 is configured to classify each vehicle image 42a as one of a plurality of vehicle types or vehicle classes.

Referring to FIG. 8, an exemplary graphical user interface 34 is illustrated of the client computing device 36 executing the application client 32A according to the example of FIG. 7. The alert 54 and user prompt 56 is shown on the graphical user interface 34. The user prompt 56 is configured with a message and buttons to allow the user to input a user-curated response label 44A for the run-time input data 42. In this example, the run-time input data 42 is an image 42a of an aircraft, and the predicted response label 46 predicted by the supervised artificial intelligence model 28 is an aircraft type, Boeing 747-8F, based on an image 42a of an aircraft taken by an on-board camera. If the user decides to accept the predicted response label 46 as a user-curated response label 44A, the user clicks the button corresponding to 'Boeing 747-8F' and confirms 'Boeing 747-8F' as the user-curated response label 44A which is used in a feedback training pair with the run-time input image 42a to train the unsupervised artificial intelligence model 26 and the supervised artificial intelligence model 28 in a feedback training phase. If the user decides to reject the predicted response label 46, the user clicks an alternative multiple-choice selector (the button corresponding to a 'Boeing 767' or the button corresponding to a 'Boeing 787' in this example) to select the 'Boeing 767' or the 'Boeing 787' as the alternative user-curated response label 44A, which is used to feedback train the unsupervised artificial intelligence model 26 and the supervised artificial intelligence model 28 in the manner described above.

Referring to FIG. 9, an exemplary graphical user interface 34 is illustrated of the client computing device 36 executing the application client 32A according to another example similar to FIG. 7. In this example, the run-time input data 42 includes images of an external environment of an airplane, and the predicted response labels 46 predicted by supervised artificial intelligence model 28 include different weather conditions. The user prompt 56 for the user is shown on the graphical user interface 34 for the user to indicate whether or not to accept the predicted response label 46. In this example, the predicted response label 46 predicted by supervised artificial intelligence model 28 is a weather condition, 'cloudy skies', based on an image 42a of a runway taken by an on-board camera. If the user decides to accept the predicted response label 46 for the run-time input data 42 (image 42a), the user clicks the 'yes' button and confirms 'cloudy skies' predicted response label 46 as the user-curated response label 44A which is used, along with the run-time input, to train the both the supervised and unsupervised artificial intelligence models 26, 28 in the manner described above for feedback training when an outlier is detected. If the user decides to reject the run-time input data 42, the user clicks the 'no' button, and a separate alert message can be outputted on the graphical user interface 34 indicating that an outlier has been detected for which no user-curated response label 44A has been entered. No feedback training occurs as a result of the 'no' button selection.

Figure 10:
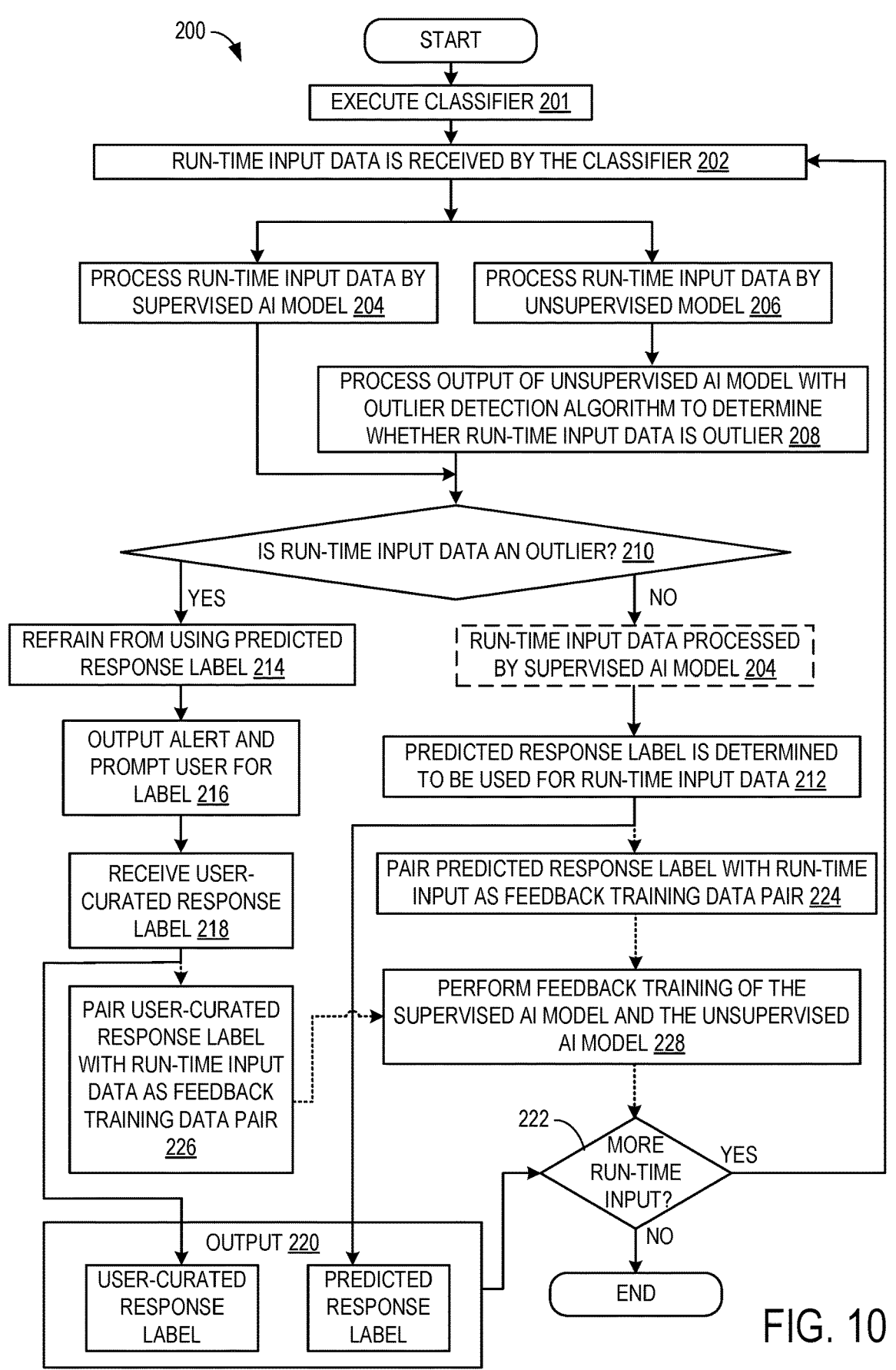
FIG. 10 shows a method for making reliable predictions using an artificial intelligence classifier that detects outliers in input data, according to one example embodiment of the subject disclosure.

Referring to FIG. 10, a flowchart is illustrated of a method 200 for determining outliers in run-time input data that is input to a classifier comprising artificial intelligence models. The following description of method 200 is provided with reference to the software and hardware components described above, and can be implemented on such hardware and software. It will be appreciated that method 200 also can be performed using other suitable hardware and software components.

At step 201, the method 200 includes executing a classifier including an unsupervised artificial intelligence model and a supervised artificial intelligence model. Executing the classifier includes the following steps 202-228. At step 202, the method includes receiving run-time input data at the classifier. At step 204, the method includes processing the run-time input data using the supervised artificial intelligence model, to thereby extract features via a second trained neural network and generate a predicted response label for the run-time input, as described above. At step 206, the method includes processing the run-time input data using the unsupervised artificial intelligence model, to thereby extract features, cluster the run-time input based on the extracted features, and generate output indicating a cluster identification and proximity to a center of the cluster for the run-time input, as described above. As described above, step 204 can be performed in parallel with step 206, or step 204 can be performed only after a determination at step 210 that the input data is not an outlier, as indicated by the placement of step 204 in dashed lines.

At step 208, the method includes processing the output of the unsupervised model 206 using an outlier detection algorithm to determine whether the run-time input data is an outlier as compared to training input data. By performance of steps 208 and 210, the method can determine whether the run-time input is an outlier.

At step 210, based on the processing at steps 208 and 210, the method includes determining whether the run-time input data is an outlier as compared to training input data that the supervised and unsupervised artificial intelligence models have been trained on during a training phase.

At step 212, responsive to determining that the run-time input data is not an outlier, the method includes determining a predicted response label for the run-time input data based on the run-time input data processed using the supervised artificial intelligence model. In other words, the predicted response label that was generated at 204 is selected for use to label the run-time input data at 212. The method proceeds from step 212 to step 220, at which the method includes outputting the predicted response label as output.

Returning to follow the YES branch from the determination at step 210, the method includes at step 214, responsive to determining that the run-time input data is an outlier, refraining from determining the predicted response label for the run-time input based on the run-time input data processed using the supervised artificial intelligence model, and instead, at 216, outputting an alert and a prompt for the user to input a user-curated response label for the run-time input data. At 218, the method includes receiving from the user a user-curated response label, examples of which are described above. The method proceeds from step 218 to step 220, at which the method includes outputting the user-curated response label as output. From the outputting step 220, the method proceeds to step 222, at which the method includes making a determination of whether more run-time input is available, and if YES, the method loops back to step 202. Otherwise, if NO, the method ends.

It will be appreciated that the method 200 can include one or more feedback training steps, as illustrated by dotted flow path lines. For example, following step 212, when the run-time input is not an outlier, at 224 the method can include pairing the predicted response label with the run-time input as a feedback training data pair. Further, at 226, when the run-time input is an outlier, the method can include pairing the user-curated response label with the runtime input data as a feedback training data pair. Following such pairing at 224 or 226 the method proceeds to step 228. When the method proceeds from 226 to 228, the method includes, responsive to receiving user input of a user-curated response label for the run-time input data, the supervised artificial intelligence model and unsupervised artificial intelligence model are trained using the user-curated response label and the run-time input data. The feedback training can be performed as described above for situations when the run-time data is determined to be an outlier. On the other hand, when the method proceeds from 224 to 228, the method can include, at step 228, performing feedback training of the supervised artificial intelligence model and the unsupervised artificial intelligence model using the predicted response label and the run-time input data. The feedback training can be performed in the manner described above for situations when the run-time input is determined not to be an outlier.

The above-described systems and methods can be used to implement a classifier that can determine whether run-time inputs are similar to data on which it has been trained, and is thus capable of making predictions only when the run-time inputs are sufficiently similar to its training data. In this way, the classifier can make more reliable predictions, and avoid the risk for an inaccurate prediction resulting from making a prediction based on run-time input that is different from its training data set. A system and method that can make such reliable predictions is particularly useful in applications with low error tolerance, such as for making predictions regarding the identification, health, safety, and/or maintenance of vehicles and vehicle component, including aircraft and aircraft components.

Figure 11:
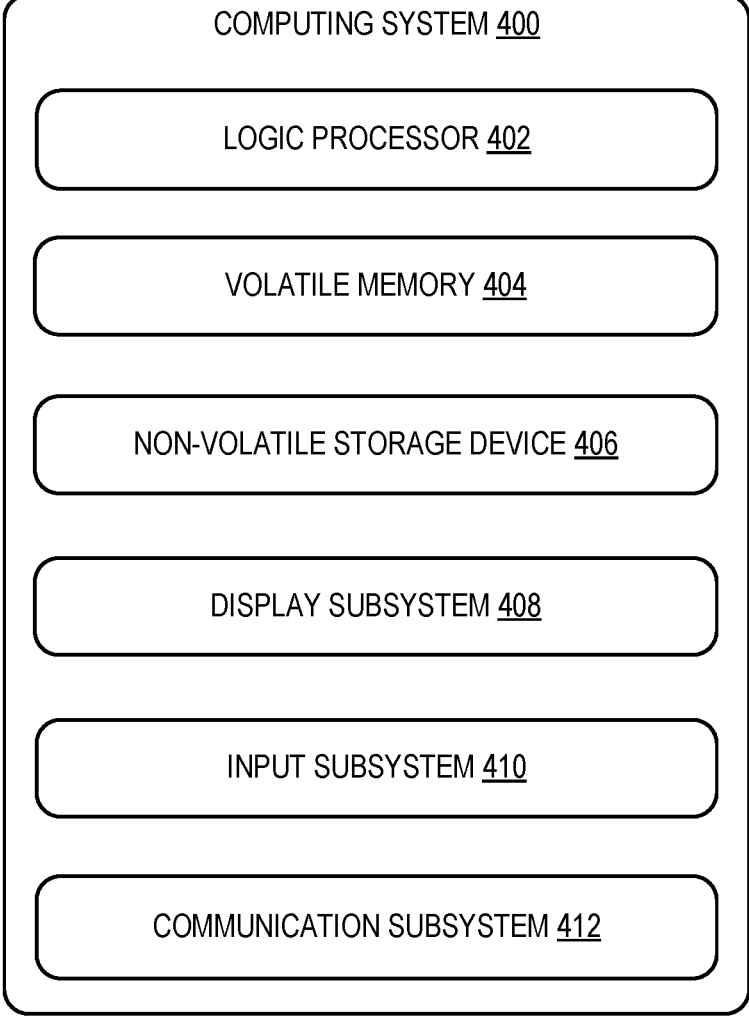
FIG. 11 shows a schematic view of an example computing environment that can be used to implement the systems and methods described herein.

FIG. 11 schematically shows a non-limiting embodiment of a computing system 400 that can enact one or more of the processes described above. Computing system 400 is shown in simplified form. Computing system 400 can embody the computing device 11 or client computing device 36 described above. Computing system 400 can take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 can optionally include a display subsystem 408, input subsystem 410, communication subsystem 412, and/or other components not shown in earlier Figures.

Logic processor 402 includes one or more physical devices configured to execute instructions. For example, the logic processor can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor can include one or more physical processors (hardware) configured to execute software instructions. Additionally or alternatively, the logic processor can include one or more hardware logic circuits or firmware devices configured to execute hardware-implemented logic or firmware instructions. Processors of the logic processor 402 can be single-core or multi-core, and the instructions executed thereon can be configured for sequential, parallel, and/or distributed processing. Individual components of the logic processor optionally can be distributed among two or more separate devices, which can be remotely located and/or configured for coordinated processing. Aspects of the logic processor can be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 can be transformed—e.g., to hold different data.

Non-volatile storage device 406 can include physical devices that are removable and/or built in. Non-volatile storage device 406 can include optical memory (e.g., CD, DVD, HD-DVD, BLU-RAY DISC™, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 can include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 can include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), SOC, and complex programmable logic devices (CPLDs), for example.

The terms "module," "program," and "engine" can be used to describe an aspect of computing system 400 typically implemented in software by a processor to perform a particular function using portions of volatile memory, which function involves transformative processing that specially configures the processor to perform the function. Thus, a module, program, or engine can be instantiated via logic processor 402 executing instructions held by non-volatile storage device 406, using portions of volatile memory 404. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

When included display subsystem 408 can be used to present a visual representation of data held by non-volatile storage device 406. The visual representation can take the form of a graphical user interface (GUI). As the herein described methods and processes change the data held by the non-volatile storage device, and thus transform the state of the non-volatile storage device, the state of display subsystem 408 can likewise be transformed to visually represent changes in the underlying data. Display subsystem 408 can include one or more display devices utilizing virtually any type of technology. Such display devices can be combined with logic processor 402, volatile memory 404, and/or non-volatile storage device 406 in a shared enclosure, or such display devices can be peripheral display devices.

When included, input subsystem 410 can comprise or interface with one or more user-input devices such as a keyboard, mouse, touch screen, or game controller. In some embodiments, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 can be configured to communicatively couple various computing devices described herein with each other, and with other devices. Communication subsystem 412 can include wired and/or wireless communication devices compatible with one or more different communication protocols. As non-limiting examples, the communication subsystem can be configured for communication via a wireless telephone network, or a wired or wireless local- or wide-area network, such as a HDMI over Wi-Fi connection. In some embodiments, the communication subsystem can allow computing system 400 to send and/or receive messages to and/or from other devices via a network such as the Internet.

It will be appreciated that "and/or" as used herein refers to the logical disjunction operation, and thus A and/or B has the following truth table.

| A | B | A and/or B |
|---|---|---|
| T | T | T |
| T | F | T |

-continued

| A | B | A and/or B |
|---|---|---|
| F | T | T |
| F | F | F |

Further, it will be appreciated that the terms "includes," "including," "has," "contains," variants thereof, and other similar words used in either the detailed description or the claims are intended to be inclusive in a manner similar to the term "comprising" as an open transition word without precluding any additional or other elements.

It will be understood that the configurations and/or approaches described herein are exemplary in nature, and that these specific embodiments or examples are not to be considered in a limiting sense, because numerous variations are possible. The specific routines or methods described herein can represent one or more of any number of processing strategies. As such, various acts illustrated and/or described can be performed in the sequence illustrated and/or described, in other sequences, in parallel, or omitted. Likewise, the order of the above-described processes can be changed.

The subject disclosure includes all novel and non-obvious combinations and subcombinations of the various features and techniques disclosed herein. The various features and techniques disclosed herein are not necessarily required of all examples of the subject disclosure. Furthermore, the various features and techniques disclosed herein can define patentable subject matter apart from the disclosed examples and can find utility in other implementations not expressly disclosed herein.

The systems and processes described herein have the potential benefits of improving the reliability of artificial intelligence and machine learning decision making systems by providing robust outlier detection systems and processes incorporating supervised learning methods that cross-check real-time input data against training input data.

Further, the disclosure comprises configurations according to the following clauses.

Clause 1. A computing system, comprising: a processor and a non-volatile memory storing executable instructions that, in response to execution by the processor, cause the processor to: execute a classifier including an unsupervised artificial intelligence model and a supervised artificial intelligence model, the classifier being configured to: receive run-time input data; process the run-time input data using the unsupervised artificial intelligence model and an outlier detection algorithm to determine whether the run-time input data is an outlier as compared to training input data; responsive to determining that the run-time input data is not an outlier, determine a predicted response label for the run-time input data based on the run-time input data processed using the supervised artificial intelligence model; and responsive to determining that the run-time input data is an outlier, refrain from determining the predicted response label for the run-time input data based on the run-time input data processed using the supervised artificial intelligence model, and instead output a prompt for user input of a user-curated response label for the run-time input data.

Clause 2. The computing system of clause 1, wherein the unsupervised artificial intelligence model includes a first neural network that has been trained on the training input data; and wherein the supervised artificial intelligence model includes a second neural network that has been trained on the training input data and ground truth labels that are associated with the training input data.

Clause 3. The computing system of clause 1 or 2, wherein the classifier is configured to process the run-time input data using the unsupervised artificial intelligence model at least in part by extracting a first set of features from the run-time input data using the unsupervised artificial intelligence model; and wherein the classifier is configured to process the run-time input data using the supervised artificial intelligence model at least in part by extracting a second set of features from the run-time input data using the supervised artificial intelligence model.

Clause 4. The computing system of any of clauses 1 to 3, wherein the unsupervised artificial intelligence model includes a clustering algorithm or a self-organizing map configured to identify a plurality of clusters in the training input data, classify the run-time input data as belonging to a classified cluster of the plurality of identified clusters, wherein the outlier detection algorithm is configured to determine whether the run-time input data is an outlier based upon a proximity of the run-time input data to the classified cluster.

Clause 5. The computing system of any of clauses 1 to 4, wherein the clustering algorithm implements one or more of hierarchical clustering, k-means clustering, mixture modeling, a DBSCAN (Density-Based Spatial Clustering of Applications with Noise) algorithm, and an OPTICS (Ordering Points To Identify the Clustering Structure) algorithm.

Clause 6. The computing system of any of clauses 1 to 5, wherein the processor is further configured to, when the run-time input data is determined to be an outlier: receive the user input including the user-curated response label for the training input data; pair the user-curated response label with the run-time input data to create a feedback training data pair; perform feedback training of the supervised artificial intelligence model based on the run-time input data and the user-curated response label of the feedback training data pair; and perform feedback training of the unsupervised artificial intelligence model based on the run-time input data.

Clause 7. The computing system of any of clauses 1 to 6, wherein the processor is further configured to, when the run-time input data is determined not to be an outlier: pair the predicted response label with the run-time input data to create a feedback training data pair; perform feedback training of the supervised artificial intelligence model based on the run-time input data and the predicted response label of the feedback training data pair; and perform feedback training of the unsupervised artificial intelligence model based on the run-time input data.

Clause 8. The computing system of any of clauses 1 to 7, wherein the processor is further configured to: responsive to determining that the run-time input data is an outlier, output an alert indicating that the outlier has been detected.

Clause 9. The computing system of any of clauses 1 to 8, wherein the unsupervised artificial intelligence model includes a first neural network including an input layer connected to one or more convolutional layers configured to extract features from the run-time input data, and an output layer configured to output a cluster identification and a proximity to a cluster for the run-time input data.

Clause 10. The computing system of any of clauses 1 to 9, wherein the supervised artificial intelligence model includes an input layer connected to one or more convolutional layers, additionally includes one or more fully connected deep learning layers connected to the convolutional layers, and further includes an output layer including a plurality of nodes each indicating a respective predicted response label.

Clause 11. The computing system of any of clauses 1 to 10, wherein the training input data includes a collection of images from a camera on board a vehicle, the images capturing an external environment of the vehicle; wherein the ground truth labels associated with the training input data include a vehicle type label for each of the images selected from a defined set of vehicle type labels; and wherein the predicted response label is one of the vehicle type labels.

Clause 12. The computing system of any of clauses 1 to 11, wherein the vehicle is an aircraft and the vehicle type labels are aircraft type labels.

Clause 13. The computing system of any of clauses 1 to 12, wherein the run-time input data is sensor data; wherein the unsupervised artificial intelligence model and the supervised artificial intelligence model are LSTM (long short-term memory) recurrent neural networks; and wherein the predicted response label is a time regression.

Clause 14. A method for a computing system comprising a processor and a non-volatile memory storing executable instructions, the method comprising: executing a classifier including an unsupervised artificial intelligence model and a supervised artificial intelligence model, executing the classifier including: receiving run-time input data; processing the run-time input data using the unsupervised artificial intelligence model and an outlier detection algorithm to determine whether the run-time input data is an outlier as compared to training input data; responsive to determining that the run-time input data is not an outlier, determining a predicted response label for the run-time input data based on the run-time input data processed using the supervised artificial intelligence model; and responsive to determining that the run-time input data is an outlier, refraining from determining the predicted response label for the run-time input data based on the run-time input data processed using the supervised artificial intelligence model, and instead outputting a prompt for user input of a user-curated response label for the run-time input data.

Clause 15. The method of clause 14, wherein the unsupervised artificial intelligence model includes a first neural network that has been trained on the training input data; and wherein the supervised artificial intelligence model includes a second neural network that has been trained on the training input data and ground truth labels that are associated with the training input data.

Clause 16. The method of clause 14 or 15, wherein the classifier is configured to process the run-time input data using the unsupervised artificial intelligence model at least in part by extracting a first set of features from the run-time input data using the unsupervised artificial intelligence model; and wherein the classifier is configured to process the run-time input data using the supervised artificial intelligence model at least in part by extracting a second set of features from the run-time input data using the supervised artificial intelligence model.

Clause 17. The method of any of clauses 14 to 16, wherein the unsupervised artificial intelligence model includes a clustering algorithm or a self-organizing map configured to identify a plurality of clusters in the training input data, classify the run-time input data as belonging to a classified cluster of the plurality of identified clusters, wherein the outlier detection algorithm is configured to determine whether the run-time input data is an outlier based upon a proximity of the run-time input data to the classified cluster.

Clause 18. The method of any of clauses 14 to 17, wherein the clustering algorithm of the unsupervised artificial intelligence model implements one or more of hierarchical clustering, k-means clustering, mixture modeling, a DBSCAN (Density-Based Spatial Clustering of Applications with Noise) algorithm, and an OPTICS (Ordering Points To Identify the Clustering Structure) algorithm.

Clause 19. The method of any of clauses 14 to 18, further comprising, when the run-time input data is determined to be an outlier: receiving the user input including the user-curated response label for the training input data; pairing the user-curated response label with the run-time input data to create a feedback training data pair; performing feedback training of the supervised artificial intelligence model based on the run-time input data and the user-curated response label of the feedback training data pair; and performing feedback training of the unsupervised artificial intelligence model based on the run-time input data.

Clause 20. The method of any of clauses 14 to 19, when the run-time input data is determined not to be an outlier: pairing the predicted response label with the run-time input data to create a feedback training data pair; performing feedback training of the supervised artificial intelligence model based on the run-time input data and the predicted response label of the feedback training data pair; and performing feedback training of the unsupervised artificial intelligence model based on the run-time input data.

Clause 21. The method of any of clauses 14 to 20, further comprising: responsive to determining that the run-time input data is an outlier, output an alert indicating that the outlier has been detected.

Clause 22. The method of any of clauses 14 to 21, wherein the unsupervised artificial intelligence model includes a first neural network including an input layer connected to one or more convolutional layers configured to extract features from a run-time input vector, and an output layer configured to output a cluster identification and a proximity to a cluster for the run-time input data.

Clause 23. The method of any of clauses 14 to 22, wherein the supervised artificial intelligence model includes an input layer connected to one or more convolutional layers, additionally includes one or more fully connected deep learning layers connected to the convolutional layers, and further includes an output layer including a plurality of nodes each indicating a respective predicted response label.

Clause 24. The method of any of clauses 14 to 23, wherein the training input data includes a collection of images from an on-board camera, the images capturing an external environment of a vehicle; wherein the ground truth labels associated with the training input data include a vehicle type label for each of the images selected from a defined set of vehicle type labels; and wherein the predicted response label is one of the vehicle type labels.

Clause 25. The method of any of clauses 14 to 24, wherein the vehicle is an aircraft and the vehicle type labels are aircraft type labels.

Clause 26. The method of any of clauses 14 to 25, wherein the run-time input data is sensor data; wherein the unsupervised artificial intelligence model and the supervised artificial intelligence model are LSTM (long short-term memory) recurrent neural networks; and wherein the predicted response label is a time regression.

Clause 27. A computing system, comprising: a processor and a non-volatile memory storing executable instructions that, in response to execution by the processor, cause the processor to: execute a classifier including an unsupervised artificial intelligence model and a supervised artificial intelligence model, wherein the unsupervised artificial intelligence model has been trained on training input data, and the supervised artificial intelligence model has been trained on the training input data and ground truth labels that are associated with the training input data, wherein the training input data includes a collection of images, the images capturing an environment of a vehicle, wherein the ground truth labels associated with the training input data include a vehicle type label for each of the images selected from a defined set of vehicle type labels, the classifier being configured to: receive run-time input data including an image; process the run-time input data using the unsupervised artificial intelligence model and an outlier detection algorithm to determine whether the run-time input data is an outlier as compared to training input data; responsive to determining that the run-time input data is not an outlier, determine a predicted response label for the run-time input data based on the run-time input data processed using the supervised artificial intelligence model, wherein the predicted response label is one of the vehicle type labels; and responsive to determining that the run-time input data is an outlier, refrain from determining the predicted response label for the run-time input data based on the run-time input data processed using the supervised artificial intelligence model, and instead output a prompt for user input of a user-curated response label for the run-time input data.

Clause 28. The computing system of clause 27, wherein the vehicle is an aircraft and the vehicle type labels are aircraft type labels.

The invention claimed is:

1. A computing system, comprising:
a processor and a non-volatile memory storing executable instructions that, in response to execution by the processor, cause the processor to:
execute a classifier including an unsupervised artificial intelligence model and a supervised artificial intelligence model, the supervised artificial intelligence model being logically distinct from the unsupervised artificial intelligence model, the unsupervised artificial intelligence model comprising a first neural network and the supervised artificial intelligence model comprising a second neural network, the classifier being configured to:

receive run-time input data;

process the run-time input data using the unsupervised artificial intelligence model and an outlier detection algorithm to determine whether the run-time input data is an outlier as compared to training input data;

responsive to determining that the run-time input data is not an outlier, determine a predicted response label for the run-time input data based on the run-time input data processed using the supervised artificial intelligence model; and responsive to determining that the run-time input data is an outlier, refrain from determining the predicted response label for the run-time input data based on the run-time input data processed using the supervised artificial intelligence model, and instead output a prompt for user input of a user-curated response label for the run-time input data, wherein the unsupervised artificial intelligence model includes a clustering algorithm or a self-organizing map configured to identify a plurality of clusters in the training input data, classify the run-time input data as belonging to a classified cluster of the plurality of identified clusters, wherein the outlier detection algorithm is configured to determine whether the run-time input data is an outlier based upon a proximity of the run-time input data to the classified cluster; and wherein the clustering algorithm implements one or more of hierarchical clustering, k-means clustering, mixture modeling, a DBSCAN (Density-Based Spatial Clustering of Applications with Noise) algorithm, and an OPTICS (Ordering Points To Identify the Clustering Structure) algorithm.

2. The computing system of claim 1, wherein the first neural network has been trained on the training input data;

wherein the second neural network has been trained on the training input data and ground truth labels that are associated with the training input data;

wherein the classifier is configured to process the run-time input data using the unsupervised artificial intelligence model at least in part by extracting a first set of features from the run-time input data using the unsupervised artificial intelligence model; and wherein the classifier is configured to process the run-time input data using the supervised artificial intelligence model at least in part by extracting a second set of features from the run-time input data using the supervised artificial intelligence model.

3. The computing system of claim 2, wherein the training input data includes a collection of images from a camera on board a vehicle, the images capturing an external environment of the vehicle;

wherein the ground truth labels associated with the training input data include a vehicle type label for each of the images selected from a defined set of vehicle type labels; and wherein the predicted response label is one of the vehicle type labels.

4. The computing system of claim 3, wherein the vehicle is an aircraft and the vehicle type labels are aircraft type labels.

5. The computing system of claim 1, wherein the processor is further configured to, when the run-time input data is determined to be an outlier:

receive the user input including the user-curated response label for the training input data;

pair the user-curated response label with the run-time input data to create a feedback training data pair;

perform feedback training of the supervised artificial intelligence model based on the run-time input data and the user-curated response label of the feedback training data pair;

perform feedback training of the unsupervised artificial intelligence model based on the run-time input data; and output an alert indicating that the outlier has been detected.

6. The computing system of claim 1, wherein the processor is further configured to, when the run-time input data is determined not to be an outlier:

pair the predicted response label with the run-time input data to create a feedback training data pair;

perform feedback training of the supervised artificial intelligence model based on the run-time input data and the predicted response label of the feedback training data pair; and perform feedback training of the unsupervised artificial intelligence model based on the run-time input data.

7. The computing system of claim 1, wherein the first neural network includes an input layer connected to one or more convolutional layers configured to extract features from the run-time input data, and an output layer configured to output a cluster identification and a proximity to a cluster for the run-time input data.

8. The computing system of claim 1, wherein the supervised artificial intelligence model includes an input layer connected to one or more convolutional layers, additionally includes one or more fully connected deep learning layers connected to the convolutional layers, and further includes an output layer including a plurality of nodes each indicating a respective predicted response label.

9. The computing system of claim 1, wherein the run-time input data is sensor data;

wherein the unsupervised artificial intelligence model and the supervised artificial intelligence model are LSTM (long short-term memory) recurrent neural networks; and wherein the predicted response label is a time regression.

10. A method for a computing system comprising a processor and a non-volatile memory storing executable instructions, the method comprising:

executing a classifier including an unsupervised artificial intelligence model and a supervised artificial intelligence model, the supervised artificial intelligence model being logically distinct from the unsupervised artificial intelligence model, the unsupervised artificial intelligence model comprising a first neural network and the supervised artificial intelligence model comprising a second neural network, executing the classifier including:

receiving run-time input data;

processing the run-time input data using the unsupervised artificial intelligence model and an outlier detection algorithm to determine whether the run-time input data is an outlier as compared to training input data;

responsive to determining that the run-time input data is not an outlier, determining a predicted response label for the run-time input data based on the run-time input data processed using the supervised artificial intelligence model; and responsive to determining that the run-time input data is an outlier, refraining from determining the predicted response label for the run-time input data based on the run-time input data processed using the supervised artificial intelligence model, and instead outputting a prompt for user input of a user-curated response label for the run-time input data, wherein the unsupervised artificial intelligence model includes a clustering algorithm or a self-organizing map configured to identify a plurality of clusters in the training input data, classify the run-time input data as belonging to a classified cluster of the plurality of identified clusters, wherein the outlier detection algorithm is configured to determine whether the run-time input data is an outlier based upon a proximity of the run-time input data to the classified cluster; and wherein the clustering algorithm of the unsupervised artificial intelligence model implements one or more of hierarchical clustering, k-means clustering, mixture modeling, a DBSCAN (Density-Based Spatial Clustering of Applications with Noise) algorithm, and an OPTICS (Ordering Points To Identify the Clustering Structure) algorithm.

11. The method of claim 10,
wherein the first neural network has been trained on the training input data; and
wherein the second neural network has been trained on the training input data and ground truth labels that are associated with the training input data;
wherein the classifier is configured to process the run-time input data using the unsupervised artificial intelligence model at least in part by extracting a first set of features from the run-time input data using the unsupervised artificial intelligence model; and
wherein the classifier is configured to process the run-time input data using the supervised artificial intelligence model at least in part by extracting a second set of features from the run-time input data using the supervised artificial intelligence model.

12. The method of claim 11,
wherein the training input data includes a collection of images from an on-board camera, the images capturing an external environment of a vehicle;
wherein the ground truth labels associated with the training input data include a vehicle type label for each of the images selected from a defined set of vehicle type labels; and
wherein the predicted response label is one of the vehicle type labels.

13. The method of claim 12, wherein the vehicle is an aircraft and the vehicle type labels are aircraft type labels.

14. The method of claim 10, further comprising, when the run-time input data is determined to be an outlier:
receiving the user input including the user-curated response label for the training input data;
pairing the user-curated response label with the run-time input data to create a feedback training data pair;
performing feedback training of the supervised artificial intelligence model based on the run-time input data and the user-curated response label of the feedback training data pair;
performing feedback training of the unsupervised artificial intelligence model based on the run-time input data; and
outputting an alert indicating that the outlier has been detected, and when the run-time input data is determined not to be an outlier:
pairing the predicted response label with the run-time input data to create a feedback training data pair;
performing feedback training of the supervised artificial intelligence model based on the run-time input data and the predicted response label of the feedback training data pair; and
performing feedback training of the unsupervised artificial intelligence model based on the run-time input data.

15. The method of claim 10, wherein the first neural network includes an input layer connected to one or more convolutional layers configured to extract features from a run-time input vector, and an output layer configured to output a cluster identification and a proximity to a cluster for the run-time input data.

16. The method of claim 10, wherein the supervised artificial intelligence model includes an input layer connected to one or more convolutional layers, additionally includes one or more fully connected deep learning layers connected to the convolutional layers, and further includes an output layer including a plurality of nodes each indicating a respective predicted response label.

17. The method of claim 10,
wherein the run-time input data is sensor data;
wherein the unsupervised artificial intelligence model and the supervised artificial intelligence model are LSTM (long short-term memory) recurrent neural networks; and
wherein the predicted response label is a time regression.

18. A computing system, comprising:
a processor and a non-volatile memory storing executable instructions that, in response to execution by the processor, cause the processor to:
execute a classifier including an unsupervised artificial intelligence model and a supervised artificial intelligence model, the supervised artificial intelligence model being logically distinct from the unsupervised artificial intelligence model, the unsupervised artificial intelligence model comprising a first neural network and the supervised artificial intelligence model comprising a second neural network, the classifier being configured to:
receive run-time input data including an image;
process the run-time input data using the unsupervised artificial intelligence model and an outlier detection algorithm to determine whether the run-time input data is an outlier as compared to training input data;
responsive to determining that the run-time input data is not an outlier, determine a predicted response label for the run-time input data based on the run- time input data processed using the supervised artificial intelligence model, wherein the predicted response label is one vehicle type label from a defined set of vehicle type labels; and
responsive to determining that the run-time input data is an outlier, refrain from determining the predicted response label for the run-time input data based on the run-time input data processed using the supervised artificial intelligence model, and instead output a prompt for user input of a user-curated response label for the run-time input data,
wherein the unsupervised artificial intelligence model includes a clustering algorithm or a self-organizing map configured to identify a plurality of clusters in the training input data, classify the run-time input data as belonging to a classified cluster of the plurality of identified clusters, wherein the outlier detection algorithm is configured to determine whether the run-time input data is an outlier based upon a proximity of the run-time input data to the classified cluster;

wherein the training input data includes a collection of images from a camera on board a vehicle, the images capturing an external environment of the vehicle;

wherein ground truth labels associated with the training input data include a vehicle type label for each of the images selected from the defined set of vehicle type labels; and wherein the vehicle is an aircraft and the vehicle type labels are aircraft type labels.

19. The computing system of claim 18, wherein the clustering algorithm implements one or more of hierarchical clustering, k-means clustering, mixture modeling, a DBSCAN (Density-Based Spatial Clustering of Applications with Noise) algorithm, and an OPTICS (Ordering Points To Identify the Clustering Structure) algorithm.

20. The computing system of claim 18, wherein the processor is further configured to, when the run-time input data is determined to be an outlier:

receive the user input including the user-curated response label for the training input data;

pair the user-curated response label with the run-time input data to create a feedback training data pair;

perform feedback training of the supervised artificial intelligence model based on the run-time input data and the user-curated response label of the feedback training data pair;

perform feedback training of the unsupervised artificial intelligence model based on the run-time input data; and output an alert indicating that the outlier has been detected.

* * * * *